United States Patent
Harrington et al.

(10) Patent No.: US 6,849,833 B2
(45) Date of Patent: Feb. 1, 2005

(54) LOGICAL FLICKER SUPPRESSION FOR A TEMPERATURE CONTROLLED HEATER LOAD

(75) Inventors: John A. Harrington, Maplewood, MN (US); Steven W. Tanamachi, Lauderdale, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/365,789

(22) Filed: Feb. 13, 2003

(65) Prior Publication Data

US 2004/0159652 A1 Aug. 19, 2004

(51) Int. Cl.⁷ .................................................. H05B 3/02
(52) U.S. Cl. ...................... 219/486; 219/501; 219/216; 219/497; 219/506; 219/499; 219/505; 399/67; 399/69
(58) Field of Search ................................ 219/486, 501, 219/216, 497, 499, 506, 505; 399/67, 69

(56) References Cited

U.S. PATENT DOCUMENTS

| | | | |
|---|---|---|---|
| 4,902,877 A | * | 2/1990 | Grasso et al. ................ 219/483 |
| 4,908,956 A | | 3/1990 | Grund |
| 5,580,478 A | | 12/1996 | Tanamachi et al. |
| 5,818,208 A | | 10/1998 | Othman et al. |
| 5,907,743 A | | 5/1999 | Takahashi |
| 6,188,208 B1 | | 2/2001 | Glaser et al. |
| 6,420,685 B1 | * | 7/2002 | Tanamachi .................. 219/501 |

* cited by examiner

Primary Examiner—Shawntina Fuqua
(74) Attorney, Agent, or Firm—William F. Noval

(57) ABSTRACT

A temperature control system for reducing flicker in an electrical resistance heater comprising: an electrical resistance heater divided into at least two electrical loads and; a source of electrical power for repetitively supplying electrical power to each of the at least two electrical loads at successive different time sub periods within a predetermined time period, wherein the sum of the power supplied to the at least two electrical loads is equal to the total power supplied to the electrical resistance heater during the predetermined time period.

11 Claims, 6 Drawing Sheets

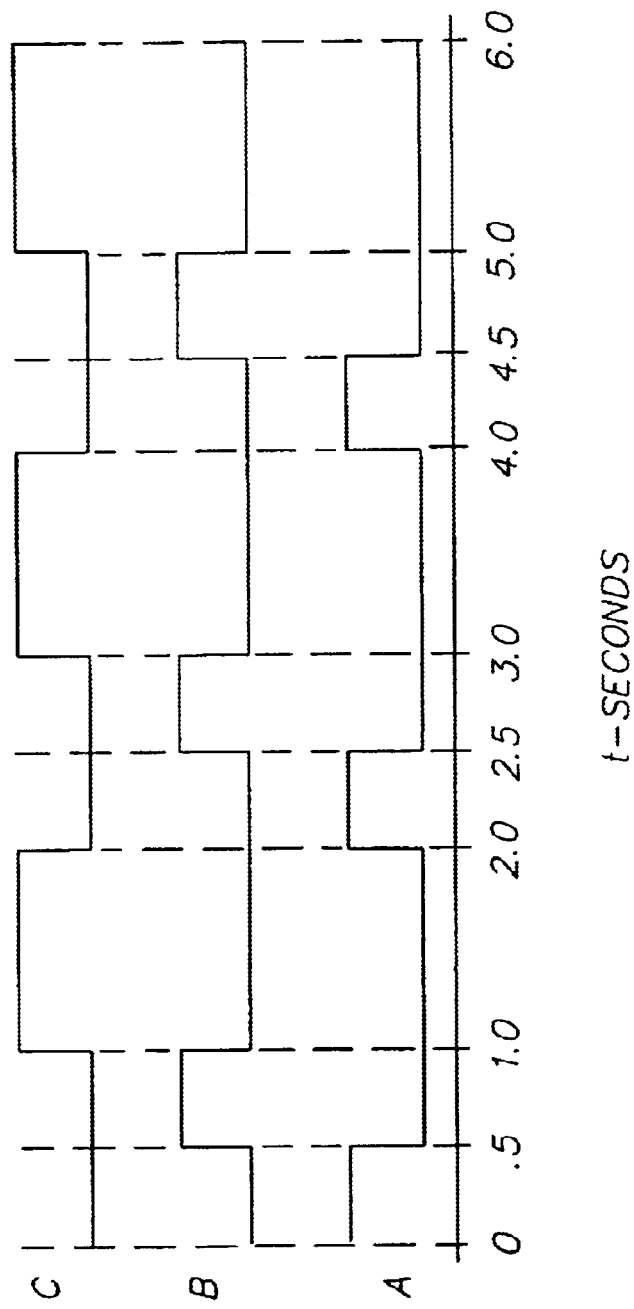

LOGICAL FLICKER SUPPRESSION FOR A TEMPERATURE CONTROLLED HEATER LOAD

FIELD OF THE INVENTION

This invention relates in general to apparatus for controlling temperature and, more particularly, to apparatus for controlling the temperature of a temperature controlled heater to reduce flicker.

BACKGROUND OF THE INVENTION

Photothermography is an established imaging technology. In photothermography, a photosensitive media is exposed to radiation to create a latent image which can be thermally processed to develop the latent image. Devices and methods for implementing this thermal development process are generally known and include contacting the imaged photosensitive media with a heated platen, drum or belt, blowing heated air onto the media, immersing the media in a heated inert liquid and exposing the media to radiant energy of a wavelength to which the media is not photosensitive, e.g., infrared. Of these conventional techniques, the use of heated drums is particularly common.

A common photosensitive media usable in these imaging processes is known as a photothermographic media, such as film and paper. One photothermographic media has a binder, silver halide, organic salt of silver (or other reducible, light-insensitive silver source), and a reducing agent for the silver ion. In the trade, these photothermographic media are known as dry silver media, including dry silver film.

In order to precisely heat exposed photothermographic media, including film and paper, it has been found to be desirable to use electrically heated drums. In apparatus employing this technique, a cylindrical drum is heated to a temperature near the desired development temperature of the photothermographic media. The photothermographic media is held in close proximity to the heated drum as the drum is rotated about its longitudinal axis. When the temperature of the surface of the heated drum is known, the portion of the circumference around which the photothermographic media is held in close proximity is known and the rate of rotation of the drum is known, the development time and temperature of the photothermographic media can be determined. Generally, these parameters are optimized for the particular photothermographic media utilized and, possibly, for the application in which the photothermographic media is employed.

In order to achieve a high quality-image in the photothermographic media, very precise development parameters must be maintained. Generally, the circumference of the drum over which the photothermographic media travels will not vary significantly. Also, the rate of rotation of the drum, or the transport rate of the photothermographic media through the thermal processor, can be rather precisely maintained. However, it is generally more difficult to control and maintain the temperature of the surface of the drum.

In addition, other factors also contribute to inaccurate processing. The closeness of the proximity which the photothermographic media is held to the drum partially determines the temperature at which the emulsion in the photothermographic media is heated. Further, the presence of foreign particles between the drum and the photothermographic media can interrupt the flow of heat from the drum to the photothermographic media which can affect image quality.

Because many factors affect image quality, one of which is the temperature at which the photothermographic media is developed, the preciseness at which the surface temperature of the drum can be maintained is important to thermal processing of photothermographic media.

The temperature of the drum depends upon many factors. These include the rate at which heat is delivered to the drum, the thermal conductivity and the thermal mass of the drum, the thermal mass of the photothermographic media, the rate, i.e., the number of sheets (if sheet photothermographic media is used) of photothermographic media being processed, the ambient temperature, whether thermal processing is just beginning or whether the thermal processing is in the middle of a long run.

In addition, heated drums are used extensively in various other material processing applications. Examples include calendaring, laminating, coating and drying.

Typically, heat is delivered to such drums through the use of electrical resistance heating elements. Since the heated drum is rotating during thermal processing and since it is a desirable to deliver electrical power to the electrical resistance heating elements during rotation of the drum, is desirable to be able to deliver electrical power from a stationary power source, e.g., the standard AC line, to the moving, rotating drum. Electrical power may be delivered to the drum through the use of slip rings coupled to the drum.

In addition, to precisely control the temperature of the electrically heated drum there should be a means to sense the temperature of the drum and a means to control the electrical power applied to the electrical resistance heaters in response to the signal from the temperature sensor.

U.S. Pat. No. 5,580,478, issued Dec. 3, 1996, inventors Tanamachi et al., discloses such a heated drum processor where separate electrical resistance heaters heat a central heat zone and contiguous edge zones. Temperature control of the electrical heaters is obtained through duty cycle modulation. Solid state relays in the power circuit to the electrical heaters are turned on and off with zero crossing triggering.

Power transients cause flickering light in the lighting systems that share the affected power grid. New flicker suppression standards have become law in recent years in Europe. The common practice in flicker suppression has been to add suppression electronics to an apparatus thus increasing manufacturing costs. A common solution has been to use the AC input power and its zero crossing as a reference as to when to adjust throughput power to load. U.S. Pat. No. 4,908,956, issued Mar. 20, 1990, inventor Grund, U.S. Pat. No. 5,907,743, issued May 25, 1999, inventor Takahashi, U.S. Pat. No. 6,188,208, issued Feb. 13, 2001, inventors Glaser et al., are examples. They differ in how to adjust the power on/off timing relative to the zero crossing. All use electronic circuits to implement. Another invention, U.S. Pat. No. 5,818,208, issued Oct. 6, 1998, inventors Othman et el., uses electronics to measure the AC power voltages and load currents at the voltage source converter terminal and calculate active and reactive current loads in an effort to minimize flicker.

U.S. Pat. No. 6,420,685B1, issued Jul. 16, 2002, inventor Tanamachi discloses a control system for reducing flicker in an electrical resistance heater, a bidirectional solid state switching device connected between the source and the electrical resistance heater; and a control circuit for controlling the bidirectional solid state switching device to supply a varying, phase controlled duty cycle of current to the heater which effectively ramps heater power up and down in response to a binary control signal which randomly turns on the switching device.

There is thus a need for a way to control flicker in an electrical heater system that is efficient and cost effective.

SUMMARY OF THE INVENTION

According to the present invention, there is provided a solution to the needs and problems discussed above.

According to a feature of the present invention, there is provided a temperature control system for reducing flicker in an electrical resistance heater comprising:

an electrical resistance heater divided into at least two electrical loads and;

a source of electrical power for repetitively supplying electrical power to each of said at least two electrical loads at successive different time sub periods within a predetermined time period, wherein the sum of the power supplied to said at least two electrical loads is equal to the total power supplied to said electrical resistance heater during said predetermined time period.

ADVANTAGEOUS EFFECT OF THE INVENTION

The invention has the following advantages.

1. Flicker suppression is achieved without reliance on additional electronic circuitry.
2. Flicker suppression is efficient and cost effective.

BRIEF DESCRIPTION OF THE DRAWINGS

FIG. 6 is a diagram useful in explaining the present invention.

DETAILED DESCRIPTION OF THE INVENTION

In general, the present invention provides a temperature controlled, electrically heated drum with flicker suppression. A cylindrical drum has a surface and is rotatable on an axis. An electrical heater is thermally coupled to the surface of the cylindrical drum. Solid State Relays (SSRs), non-rotatably mounted in conjunction with the cylindrical drum and electrically coupled to the electrical heaters through slip rings, controls the temperature by controlling the flow of electricity to the electrical heaters in response to control signals from the non-rotatably mounted microprocessor. A temperature sensor mechanism, rotatably mounted in conjunction with the cylindrical drum sense the temperature of the surface of the cylindrical drum and produces temperature signals indicative thereof. A microprocessor, non-rotatably mounted with respect to the cylindrical drum, controls the temperature of the electrically heated drum by generating the control signals in response to the temperature signals. An optical mechanism, coupled to the temperature control means, the temperature sensor means and rotating microprocessor means, optically couples the temperature signals from the rotating temperature sensor means to the non-rotating microprocessor means.

Figure 1:
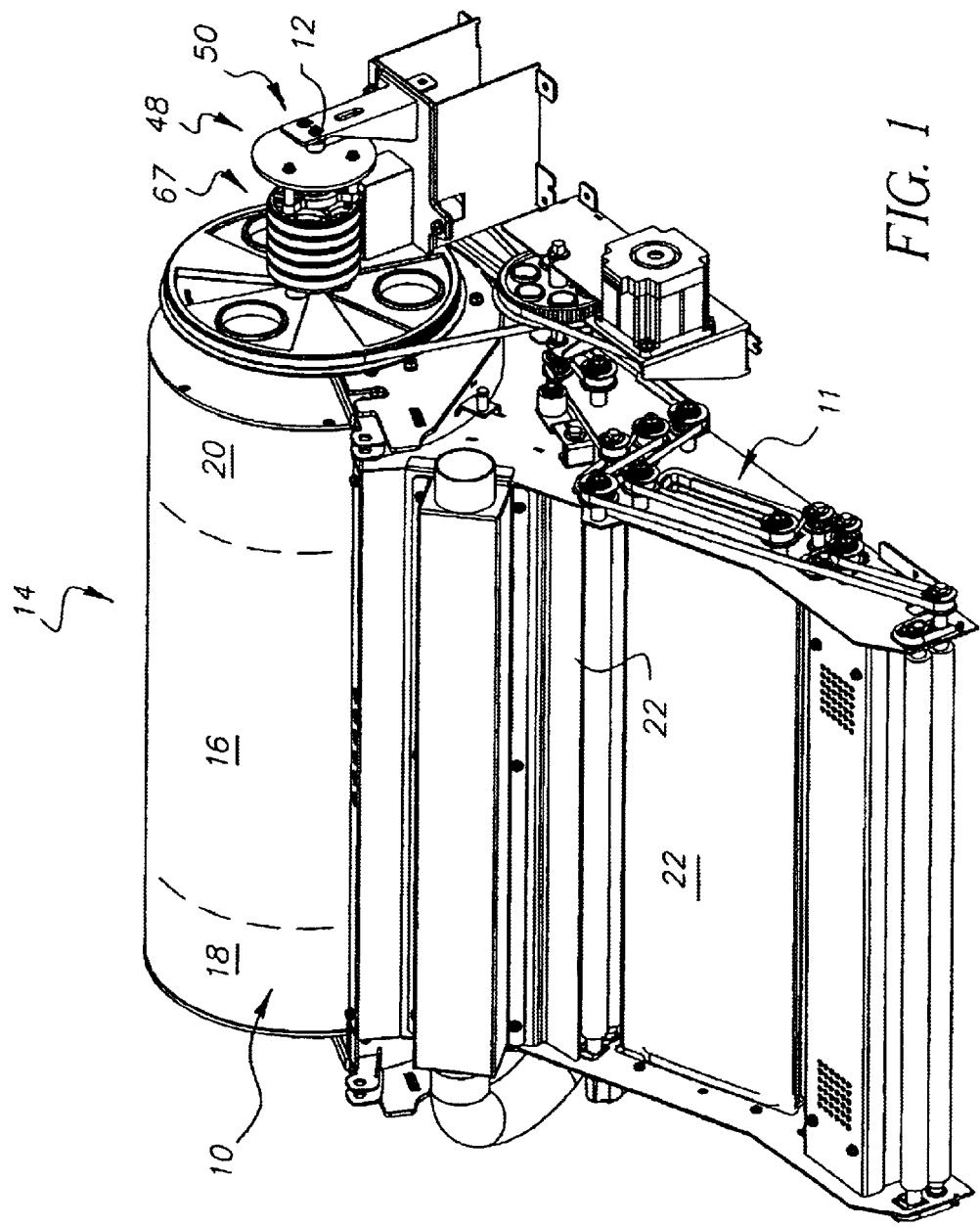
FIG. 1 is an isometric view of a portion of a thermal processor utilizing a rotatable, electrically heated drum.
Figure 2:
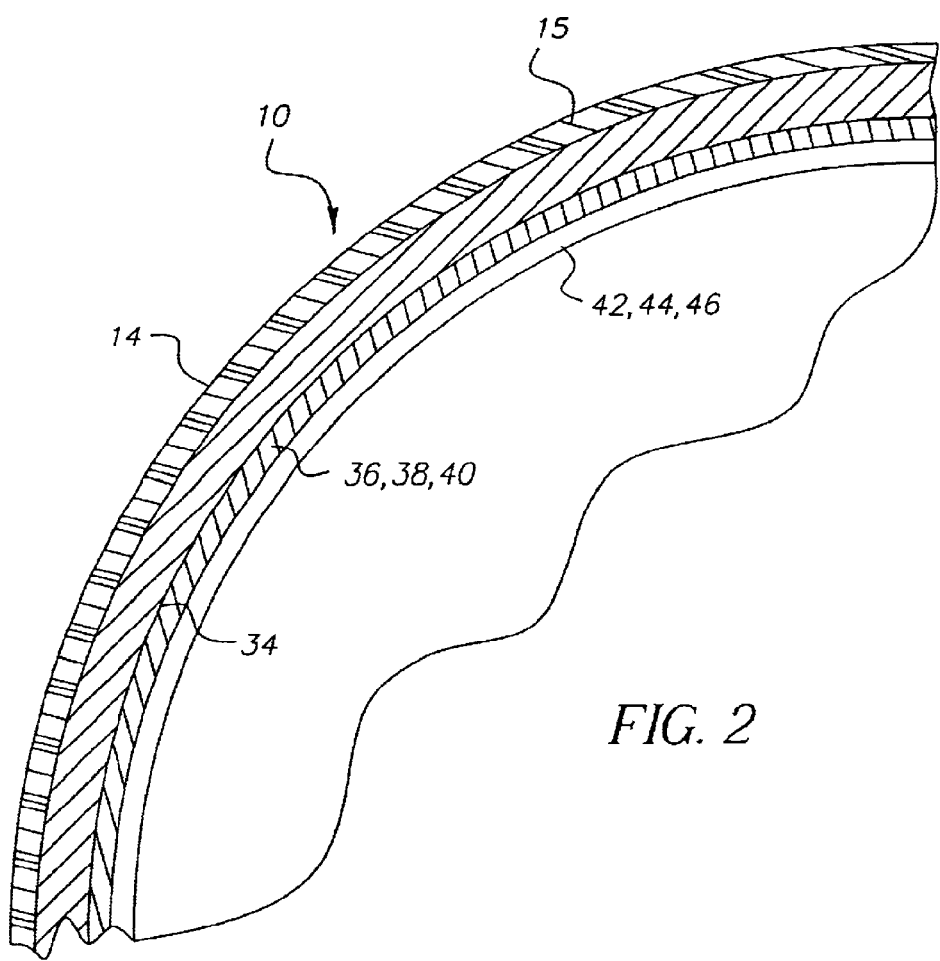
FIG. 2 is a cross-sectional view of the drum shown in FIG. 1.

A portion of a thermal processor utilizing a rotatable electrically heated drum 10 is illustrated in FIGS. 1 and 2. Such a thermal processor may be used to process medical diagnostic quality dry silver film. Cylindrical drum 10, mounted on frame 1, is rotatable around axis 12. Optionally, exterior surface 14 of drum 10 may be coated with silicone layer 15. Also, optionally, exterior surface 14 of drum 10 is divided into separately controlled heating zones 16, 18, 20. Since the edges of surface 14 of drum 10 may cool more than the central portion of surface 14, a central zone 16 is controlled independently of edge zones 18 and 20. Photothermographic media (not shown) is held in close proximity of exterior surface 14 and drum 10 over a portion of the circumference of drum 10 by means of holding down rollers (not shown). With a known temperature of exterior surface 14 of drum 10, typically 252 degrees Fahrenheit, a known rotational rate, and a known portion of circumference of surface 14 over which the photothermographic media passes, a known development temperature and dwell time can be achieved. After heated development, a cooling system 22 cools the photothermographic media to a temperature below development temperature. The cooled media is then transported to an output tray.

As shown in FIG. 2, cylindrical drum 10 is constructed from aluminum having a diameter, for example, of 8 inches (20.32 centimeters) and with a hollow interior and shell thickness for example, of 0.25 inches (0.635 centimeters). Mounted on the interior surface 34 of drum 10 are electrical resistance heaters 36, 38 and 40 adapted to heat zones 16, 18, 20, respectively. Exterior surface 14 of drum 10 may have a very delicate silicone coating 15, so temperature measurement of the drum is done internally in order not to damage the surface coatings. Mounted on the interior surface 34 of drum 10 are temperature sensors (RTDs) 42, 44 and 46 adapted to sense the temperature of zones 16, 18 and 20, respectively.

The temperature of exterior surface 14 is maintained across drum 10 and from sheet to sheet of photothermographic media to within .+−0.0.5 degrees Fahrenheit in order to produce diagnostic quality images.

Figure 3:
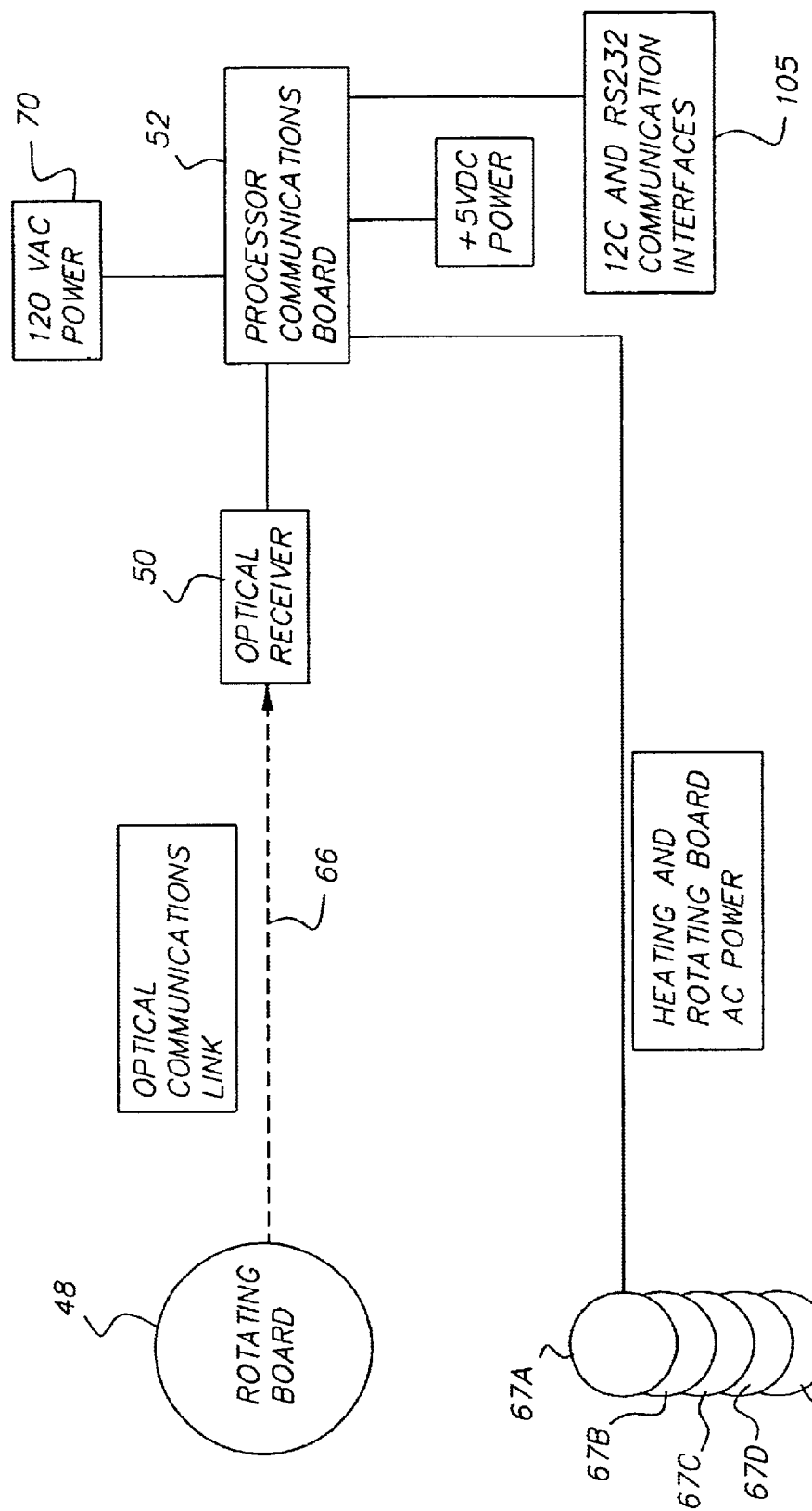
FIG. 3 is a high level block diagram of an electronic temperature control apparatus incorporating the present invention.

A high level block diagram of the major components of the temperature control circuitry is illustrated in FIG. 3. Since drum 10 is rotating, communication to electrical resistance heaters 36, 38 and 40 is done by way of slip ring assembly 67 which is mounted on one end of cylindrical drum 10 and which rotates at the same rate as drum 10. As shown in FIG. 3, circuit board 48 is optically coupled by stationary mounted optical receiver 50 positioned to optically cooperate with rotating circuit board 48. One way communication occurs over optical communications link 66 from the rotating board to the non-rotating processor communication board 52 through optical receiver 50. Rotating circuit board 48 rotates with drum 10 to communicate temperature information from the three drum heated zones 16, 18, 20 to software located on processor communications board 52 via link 66 to optical receiver 50. Processor communications board 52 contains a microprocessor whose software interprets the coded temperature information from the three heater zones 16, 18, 20 and converts it to actual zone temperatures. The software then closes the control loop by calculating via a heater control algorithm whether the heater corresponding to the sensed temperature in a particular zone should be turned on or off. The microprocessor then turns on a solid state relay to apply power to the appropriate heater through slip ring assembly 67 A–E.

Figure 4:
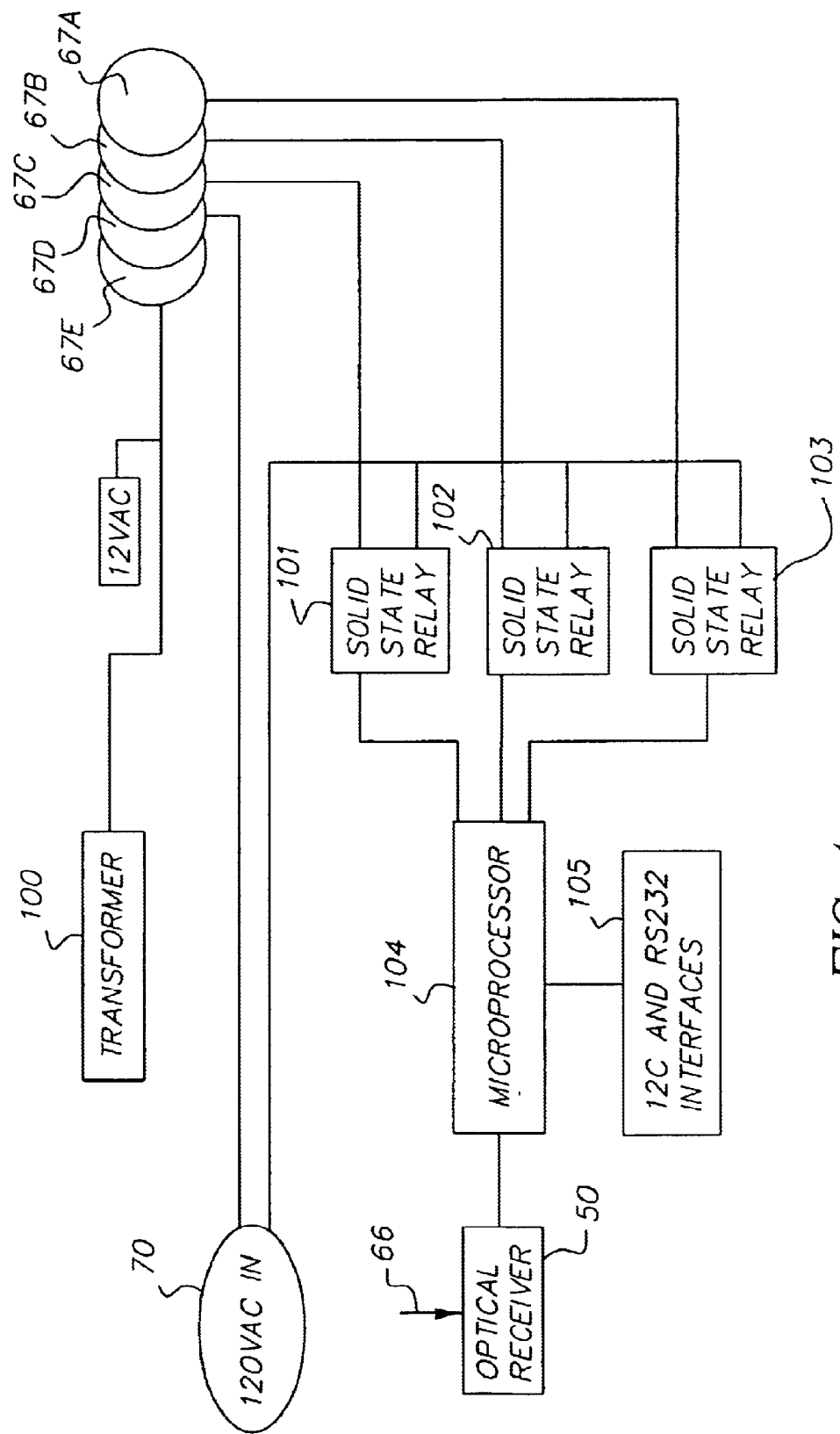
FIG. 4 is a block diagram of a processor communication board utilized in the temperature control apparatus of FIG. 3.

More detail of the function of the processor communication board 52 is shown in FIG. 4. 120 Vac from source 70 of the imager in which drum 14 is mounted is brought in to the board 52 to power the processor heaters and supply 12 Vac to power the rotating board. The 12 Vac is supplied via step down transformer 100. There are three solid state relays 101, 102 and 103 which control power to each of the three drum heaters 36, 38 and 40 under control of microprocessor 104. Coded 12 bit digital temperature data is supplied to the microprocessor 104 from each of the three temperature sensors 42, 44, 46 via optical link 66 and optical receiver 50. Communication to the rest of the imager is through the 12C interface 105. New software can also be downloaded via the communications system. Interface 105 also includes an RS232 communications port for service of the processor control system.

Figure 5:
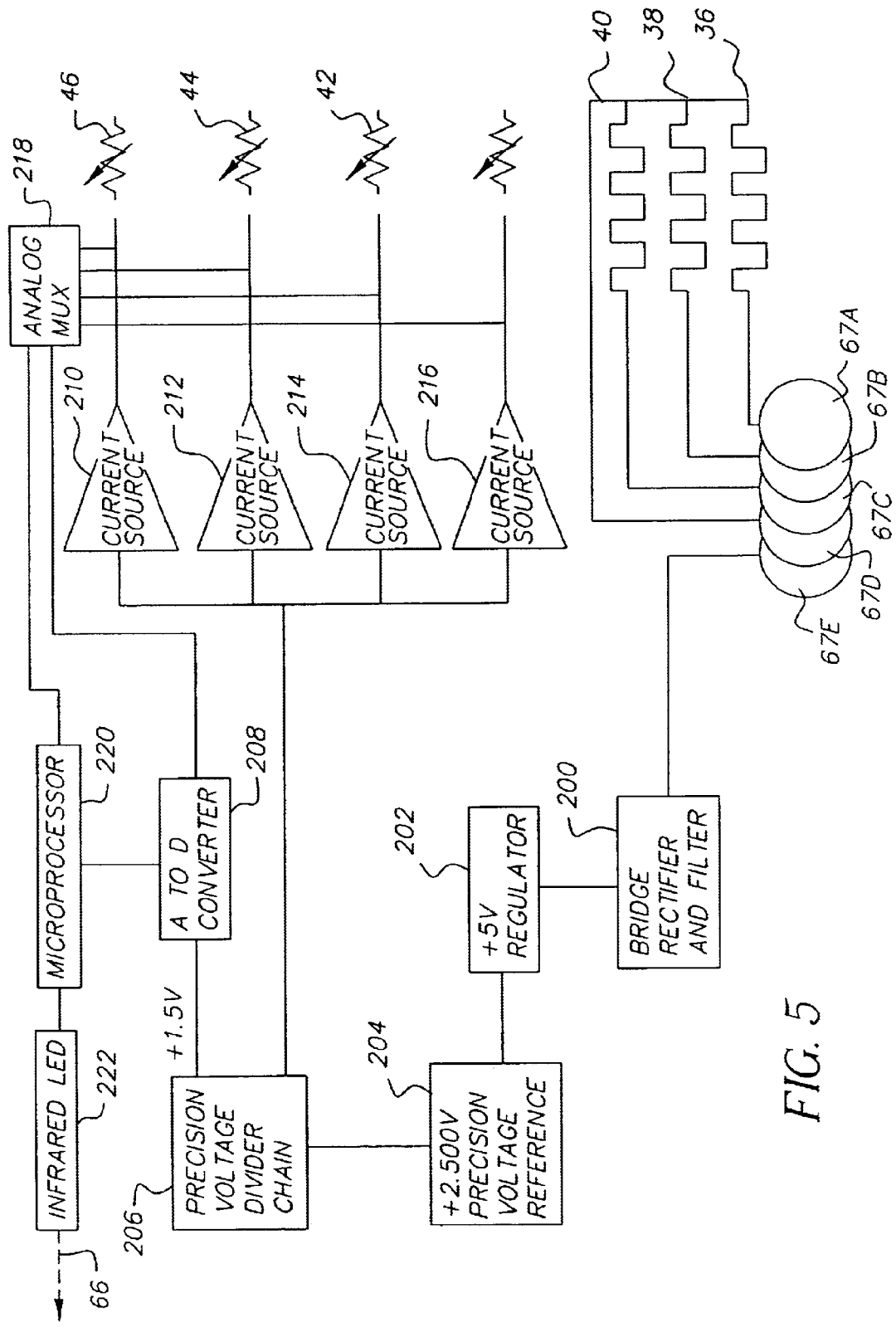
FIG. 5 is a block diagram of a rotating board utilized in the temperature control apparatus of FIG. 3.

Referring now to FIG. 5, there is shown in greater detail the electrical components disposed on the rotating drum 10. Slip rings 67 A–D supply controlled 120 Vac power to resistance heaters 36, 38 and 40. 12 Vac power is also supplied via slip ring 67E to bridge rectifier and filter 200 to produce a dc voltage supplied to +5V regulator 202. +2.5V precision voltage reference 204 and precision voltage divider chain 206 provide d. c. voltages to Analog to Digital Converter 208 and current sources 210–216. Current sources 210, 212 and 214 are respectively coupled to temperature sensors 46, 44, 42. The temperature signals from sensors 42, 44, 46 are applied to analog mux 218 which is controlled by rotating microprocessor 220. Mux 218 supplies the temperature signals serially to A to D converter 208 which converts them to digital signals which are read and processed by microprocessor 220 and then communicated over optical communications link 66 by microprocessor 220 and infrared LED 222.

According to the invention, flicker is suppressed by distributing an approximately constant level of power to multiple loads over time. There are several components to this flicker suppression solution:

1). Divide the load into two or more smaller loads.

2). Switch the power on to these loads at different times within a set period of time. This period of time continuously repeats. The duration of power applied for any specific load within its period of time is what we call the duty cycle for that load's power consumption. A 50% duty cycle means power is applied for a half of a period. Ideally, the loads have been chosen so that each load's maximum duty cycle is proportional to the time difference between switching loads. So load A should switch off before or at the time load B switches on.

3). The time between switching loads is proportional to a load's power consumption as a ratio of the whole power consumption of the apparatus. This timing is referred as the phase. For example, if power consumption is divided into 4 equal loads, then each load is switched on at 90 degrees out of phase with the previous (360 degrees to a circle). If there were 3 loads and the third load consumed twice the power of the other two, then one could switch at 0 and 90 degrees for the two equal loads, and 180 degrees for the third load. Once the third load switches on, there will be no additional loads switching on for half a period. To further this example, lets say the period is 2 seconds. In this case a load switches on at 0 seconds, the other equal load at ½ second, and the large load at 1 second. Then the whole process repeats again at the 2-second mark, and for every 2 seconds thereafter.

In the configuration of the thermal processor described above, the invention to suppress flicker can be carried out in an exemplary way as follows. AC power from source 70 is supplied to electrical resistance heaters 36, 38, 40 to heat zones 16, 18 and 20; respectively by way of solid state relays 101, 102, 103 and slip rings 67A, 67B, 67C. Relays 101, 102, 103 are controlled by microprocessor 104 to feed power to electrical resistance heaters 36, 38, 40 at different times within a set period of time. In the example given above, assuming power supplied to the middle zone 16 heated by heater 38 is twice the power supplied to end zones 18, 20 heated by heaters 36 and 40 respectively, at time 0 seconds., X watts of power would be supplied to heater 36 by switching on relay 103. At time 0.5 seconds, relay 103 would be switched off, ending power supply to heater 36 and relay 101 would be switched on to supply X watts of power to heater 40. At time 1.0 seconds, relay 101 is switched off and relay 102 switched on to 2× watts to heater 38. At 2 seconds, power to heater 38 is stopped by switching relay 102 off. The, the process is repeated again during successive 2 second periods. This power cycle is illustrated in FIG. 6 illustrates these signals. Signal A represents the power supplied to heater 36, signal B represents the power supplied to heater 40, and signal C represents the power supplied to heater 38.

A time period of 2 seconds was used for this example to allow some thermal migration of the applied power to reach the temperature sensing RTDs. This period is dependent on the thermal design of the application, but in practice can vary from 1 to 2 seconds. The temperature of a zone is measured at the end of the period, and used to calculate the duty cycle for that zone's next period. The duty cycle calculation is that of a Proportional-Integral-Difference (PID) temperature control algorithm. The flicker control discussed reduces the magnitude of this application's peak current load by a factor of 3. In practice, the duty cycles were less then that shown in FIG. 6 which show maximum load conditions. Shorter duty cycles still fall within the flicker control's reduction of the peak load draw of current.

For the condition of warming up the drum from a cold start condition, all the load current will be continuously. There is no temperature control in effect for this condition, so there will not be any current switching/flicker. Once the drum is within an operational temperature range, the PID temperature and flicker control begins.

The invention has been described in detail with particular reference to certain preferred embodiments thereof, but it will be understood that variations and modifications can be effected within the spirit and scope of the invention.

| PARTS LIST | |
|---|---|
| 10 | drum |
| 11 | frame |
| 12 | axis |
| 14 | exterior surface |
| 15 | silicone coating |
| 16, 18, 20 | controlled heating zones |
| 22 | cooling system |
| 34 | interior surface |
| 36, 38, 40 | electrical resistance heaters |
| 42, 44, 46 | temperature sensors |
| 48 | rotating circuit board |
| 50 | optical receiver sensor |
| 52 | processor communication board |
| 66 | link |
| 67 | slip ring assembly |

-continued

PARTS LIST

| | |
|---|---|
| 70 | 120 Vac power |
| 100 | transformer |
| 101 | solid state relay |
| 102 | solid state relay |
| 103 | solid state relay |
| 104 | microprocessor |
| 105 | 12C and RS232 communication interfaces |
| 200 | bridge rectifier and filter |
| 204 | precision voltage reference |
| 206 | precision voltage divider chain |
| 208 | A to D converter |
| 210 | current source |
| 212 | current source |
| 214 | current source |
| 216 | current source |
| 220 | microprocessor |
| 222 | infrared LED |

What is claimed is:

1. A temperature control system for reducing flicker in an electrical resistance heater comprising:

an electrical resistance heater divided into at least two electrical loads and;

a source of electrical power for repetitively supplying electrical power to each of said at least two electrical loads at successive different time sub periods within a predetermined time period, wherein the sum of the power supplied to said at least two electrical loads is equal to the total power supplied to said electrical resistance heater during said predetermined time period; and wherein the power supplied to each electrical load is not supplied to each other electrical load within said predetermined time period.

2. The system of claim 1 wherein the power supplied during each time subperiod is proportional to its fraction of the total power supplied during said predetermined time period.

3. The system of claim 1 wherein the power supplied to each electrical load begins at or after power is supplied to each said other electrical load.

4. The system of claim 1 wherein the time subperiod during which power is supplied to each electrical load is out of phase with the time subperiod during which power is supplied to each other electrical load.

5. The system of claim 1 including logical control means for controlling the supply of power from said source of electrical power to said at least two electrical loads of said electrical resistance heater.

6. The system of claim 1 wherein said electrical resistance heater heats a rotating drum which contacts media for processing.

7. A temperature controlled electrically heated drum assembly having reduced flicker comprising:

a cylindrical drum rotatable on an axis, said drum having an outer surface divided into a plurality of zones arranged longitudinally along said axis of said drum;

a plurality of electrical resistance heaters, one for each of said plurality of zones, thermally coupled to each of said plurality of zones, respectively; and a source of electrical power for repetitively supplying electrical power to each of said plurality of electrical resistance heaters at successive different time subperiods within a predetermined time period, wherein the sum of the power supplied to each said plurality of electrical resistance heaters is equal to the total power supplied during said predetermined time period; and wherein the power supplied to each electrical load is not supplied to each other electrical load within said predetermined period.

8. The drum assembly of claim 7 wherein the power supplied during each time subperiod is proportional to its fraction of the total power supplied during said predetermined time period.

9. The drum assembly of claim 7 wherein the power supplied to each of said plurality of electrical resistance heaters begins at or after power is supplied to another of said plurality of electrical resistance heaters.

10. The drum assembly of claim 7 wherein the time subperiod during which power is supplied to each of said plurality of electrical resistance heaters is out of phase with the time subperiod during which power is supplied to each other of said plurality of electrical resistance heaters.

11. The drum assembly of claim 7 including logical control means for controlling the supply of power from said source of electrical power to said plurality of electrical resistance heaters.

* * * * *